(12) United States Patent
Ripa et al.

(10) Patent No.: US 11,966,566 B2
(45) Date of Patent: Apr. 23, 2024

(54) MAPPING INTERACTIVE UI ELEMENTS TO RPA OBJECT REPOSITORIES FOR RPA DEVELOPMENT

(71) Applicant: UiPath, Inc., New York,, NY (US)

(72) Inventors: Bogdan Constantin Ripa, Bucharest (RO); Cosmin V. Voicu, Bucharest (RO); Ion Miron, Bucharest (RO); Mircea Grigore, Bucharest (RO)

(73) Assignee: UiPath, Inc., New York, NY (US)

( * ) Notice: Subject to any disclaimer, the term of this patent is extended or adjusted under 35 U.S.C. 154(b) by 121 days.

(21) Appl. No.: 17/451,809

(22) Filed: Oct. 21, 2021

(65) Prior Publication Data

US 2023/0125807 A1    Apr. 27, 2023

(51) Int. Cl.
*G06F 3/0484* (2022.01)
*G06F 3/0482* (2013.01)

(52) U.S. Cl.
CPC .......... *G06F 3/0484* (2013.01); *G06F 3/0482* (2013.01)

(58) Field of Classification Search
CPC ...... G06F 3/0484; G06F 3/0482; G06F 3/048; G06F 8/22; G06F 9/452
See application file for complete search history.

(56) References Cited

U.S. PATENT DOCUMENTS

| | | | |
|---|---|---|---|
| 10,127,141 B2 | 11/2018 | Kalyanasundram | |
| 10,853,097 B1 * | 12/2020 | Kakhandiki | G06F 9/451 |
| 10,871,977 B2 | 12/2020 | Hanke et al. | |
| 11,150,882 B2 | 10/2021 | Ripa | |
| 2008/0235585 A1 * | 9/2008 | Hart | G06F 16/44 715/717 |
| 2008/0301714 A1 * | 12/2008 | Martinsen | G06F 9/451 719/318 |
| 2010/0084849 A1 * | 4/2010 | Masuda | G06F 16/9554 283/67 |

(Continued)

FOREIGN PATENT DOCUMENTS

| | | |
|---|---|---|
| CN | 113268236 A | 8/2021 |
| IN | 201941032942 A | 2/2021 |

(Continued)

OTHER PUBLICATIONS

Eggplantsoftware.com, "Using Autoscan to Capture Images," webpage last updated on Aug. 19, 2021, retrieved from: http://docs.eggplantsoftware.com/ePF/using/epf-autoscan.htm, 4 pgs.

(Continued)

*Primary Examiner* — Jeanette J Parker
(74) *Attorney, Agent, or Firm* — Chiesa Shahinian & Giantomasi PC

(57) ABSTRACT

Systems and methods for mapping interactive UI (user interface) elements to an RPA (robotic process automation) object repository are provided. User input selecting a window of an application displayed on a display device is received. In response to receiving the user input selecting the window of the application, interactive UI elements in the window of the application are automatically identified. User input selecting one or more of the identified interactive UI elements in the window of the application is received. The one or more selected interactive UI elements are stored in an RPA object repository of an RPA system.

15 Claims, 14 Drawing Sheets

(56) References Cited

U.S. PATENT DOCUMENTS

| | | | |
|---|---|---|---|
| 2017/0228119 A1* | 8/2017 | Hosbettu | G06T 7/13 |
| 2017/0286155 A1 | 10/2017 | Hosabettu et al. | |
| 2017/0352041 A1 | 12/2017 | Ramamurthy et al. | |
| 2019/0095225 A1 | 3/2019 | Nandagopal | |
| 2019/0130094 A1* | 5/2019 | Votaw | H04L 63/0861 |
| 2020/0401431 A1* | 12/2020 | Rashid | G06F 9/45512 |

FOREIGN PATENT DOCUMENTS

| | | |
|---|---|---|
| WO | 2020061700 A1 | 4/2020 |
| WO | 2021176523 A1 | 9/2021 |

OTHER PUBLICATIONS

LogiGear Corporation, "The Interface Viewer," retrieved on Oct. 8, 2021, from: https://docs.testarchitect.com/user-guide/interface-definitions/the-interface-viewer/capturing-interface-definitions/, 4 pgs.
International Search Report and Written Opinion dated Jul. 18, 2022 in connection with International Application No. PCT/US2021/072195, filed Nov. 3, 2021, 9 pgs.

* cited by examiner

MAPPING INTERACTIVE UI ELEMENTS TO RPA OBJECT REPOSITORIES FOR RPA DEVELOPMENT

TECHNICAL FIELD

The present invention relates generally to RPA (robotic process automation), and more particularly to mapping interactive UI (user interface) elements to RPA object repositories for RPA development.

BACKGROUND

RPA (robotic process automation) is a form of process automation implemented to automate repetitive and/or labor-intensive tasks, thereby reducing costs and increasing efficiency. In RPA, software robots are executed to automate workflows. Such workflows comprise a plurality of activities each corresponding to one or more actions. During RPA development, workflows are defined by developers interacting with an RPA designer application to define each activity of the workflow. Activities of workflows are defined by recording interactions of the developer with interactive UI (user interface) elements, such as, e.g., buttons, checkboxes, text fields, etc. Conventionally, to record the interactions, the developer selects the interactive UI element, stores the interactive UI element in an object repository, and then performs an action on that stored interactive UI element. However, since the developer needs to select each individual interactive UI element and store the interactive UI element in an object repository before performing the action, conventional recording of interactions is intrusive and time-consuming.

BRIEF SUMMARY OF THE INVENTION

In accordance with one or more embodiments, systems and methods for mapping interactive UI (user interface) elements to an RPA (robotic process automation) object repository are provided. User input selecting a window of an application displayed on a display device is received. In response to receiving the user input selecting the window of the application, interactive UI elements in the window of the application are automatically identified. User input selecting one or more of the identified interactive UI elements in the window of the application is received. The one or more selected interactive UI elements are stored in an RPA object repository of an RPA system.

In one embodiment, the identified interactive UI elements are automatically selected. User input deselecting one or more of the automatically selected interactive UI elements is received. The interactive UI elements may comprise one or more of buttons, checkboxes, or text fields.

In one embodiment, user input editing properties of the stored interactive UI elements is received.

In one embodiment, the one or more selected interactive UI elements are compared with existing interactive UI elements stored in the RPA object repository to determine whether the one or more selected interactive UI elements are duplicates. The one or more selected interactive UI elements are stored in response to determining that the one or more selected interactive UI elements are not duplicates. In one embodiment, the comparing is performed by filtering descriptors associated with the existing interactive UI elements to generate match scores. In response to determining that none of the match scores are a maximum match score, descriptors with a top N match scores are identified, where N is any positive integer. A unified target algorithm is applied to the identified descriptors to determine whether the identified descriptors match the one or more selected interactive UI elements. The one or more selected interactive UI elements are stored in the RPA object repository in response to the unified target algorithm determining that the identified descriptors do not match the one or more selected interactive UI elements.

In one embodiment, an RPA automation of actions performed on one or more of the stored interactive UI elements is recorded.

These and other advantages of the invention will be apparent to those of ordinary skill in the art by reference to the following detailed description and the accompanying drawings.

DETAILED DESCRIPTION

Figure 1:
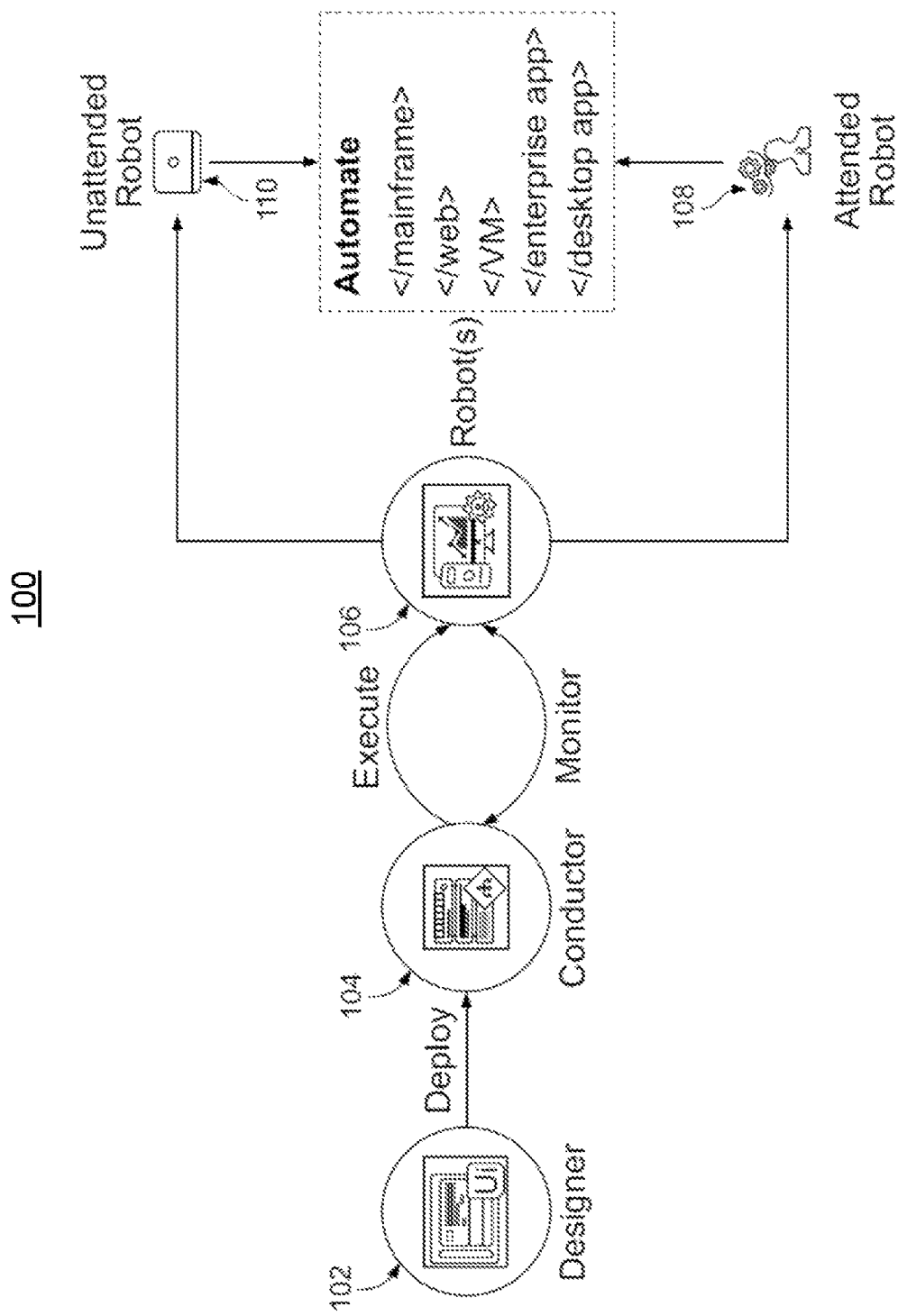
FIG. 1 is an architectural diagram illustrating a robotic process automation (RPA) system, according to an embodiment of the invention.

Embodiments described herein will be described with reference to the drawings, where like reference numerals represent the same or similar elements. In RPA (robotic process automation), robots are utilized for automatically performing workflows. RPA may be implemented by an RPA system, such as those shown in FIGS. 1-4.

FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
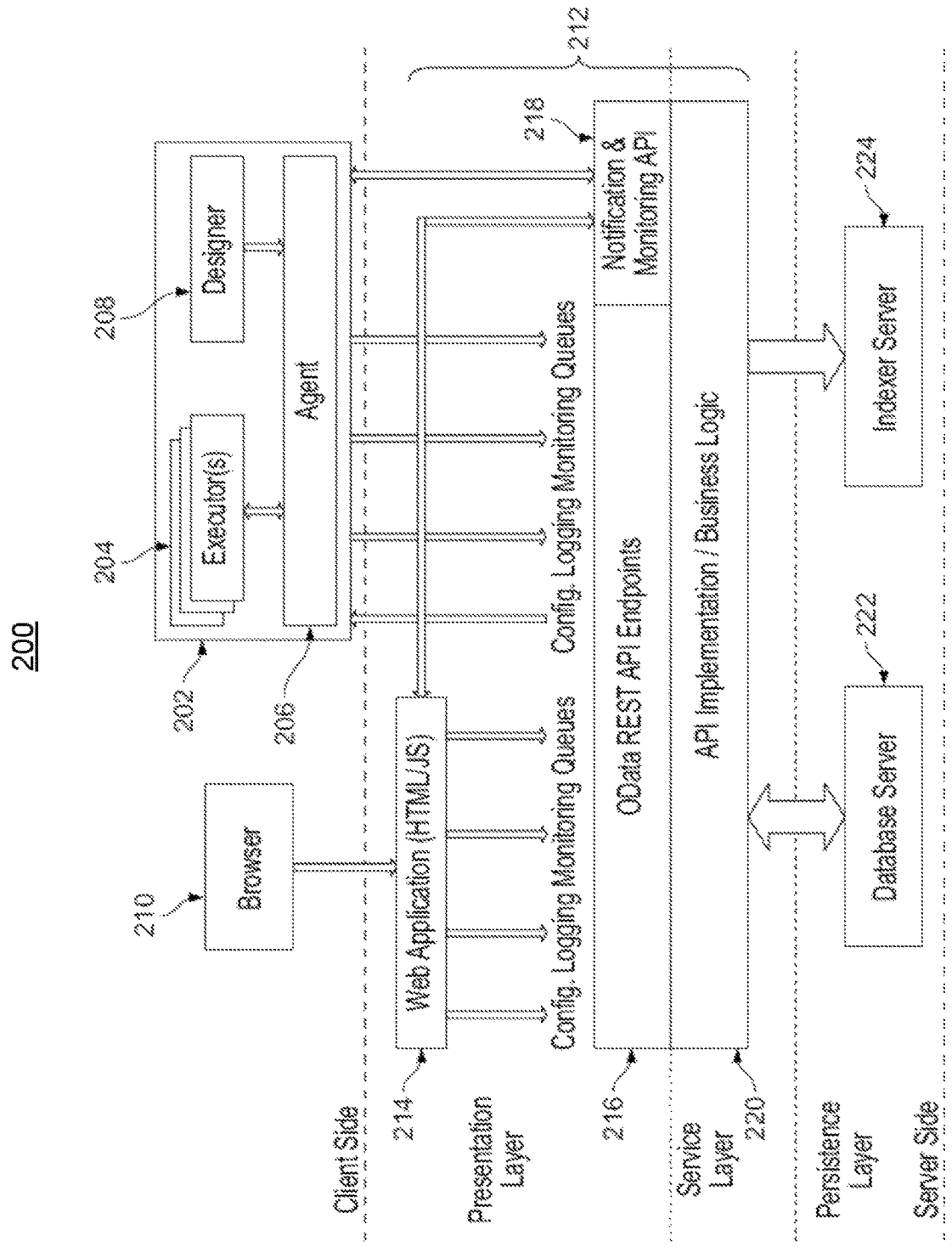
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
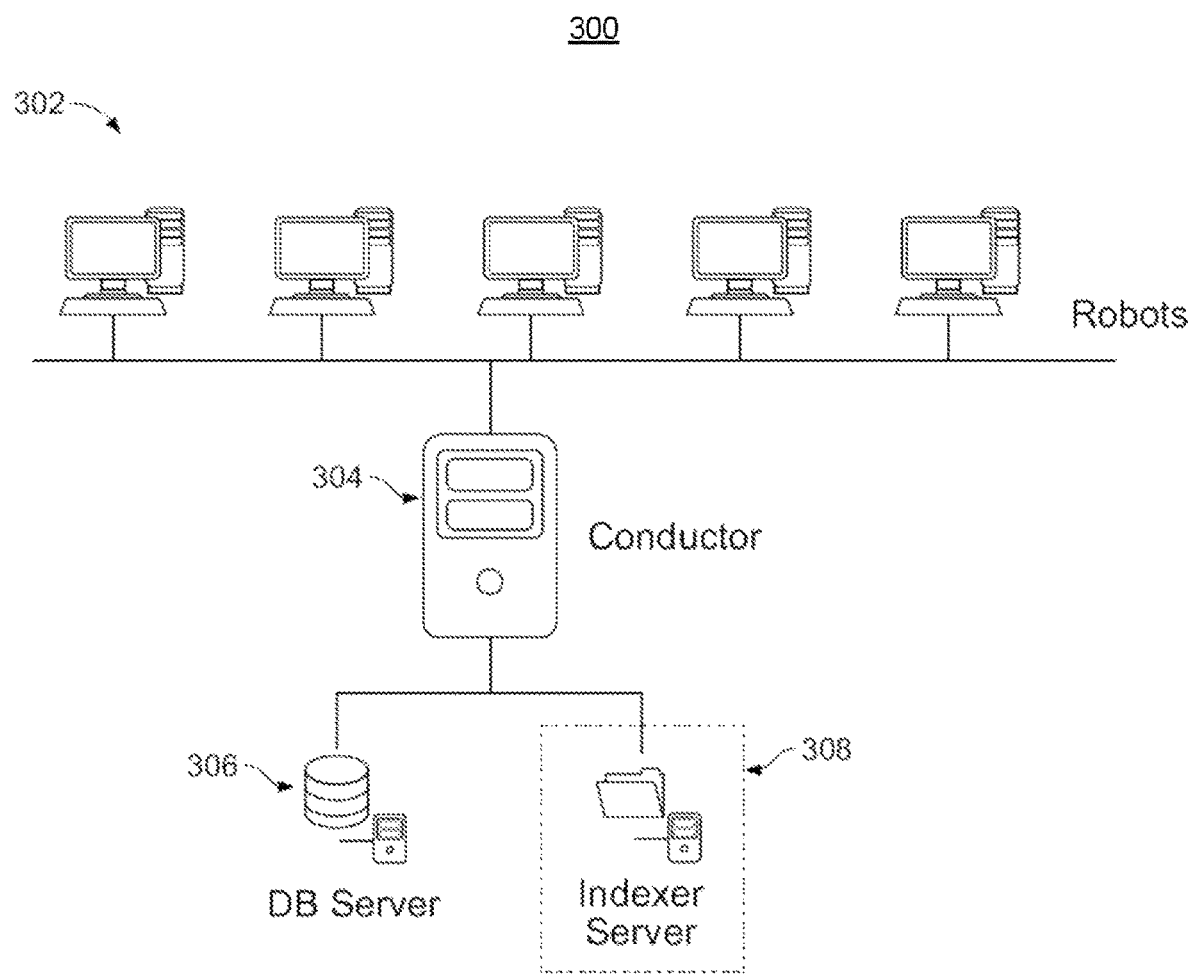
FIG. 3 is an architectural diagram illustrating a simplified deployment example of an RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 100 of FIG. 1, RPA system 200 of FIG. 2, and/or RPA system 300 of Figure may be implemented for cloud-based management of RPA robots. Such cloud-based management of RPA robots enables RPA to be provided as Software as a Service (SaaS). Accordingly, conductor 104 of FIG. 1, conductor 212 of FIG. 2, and/or conductor 304 of FIG. 3 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
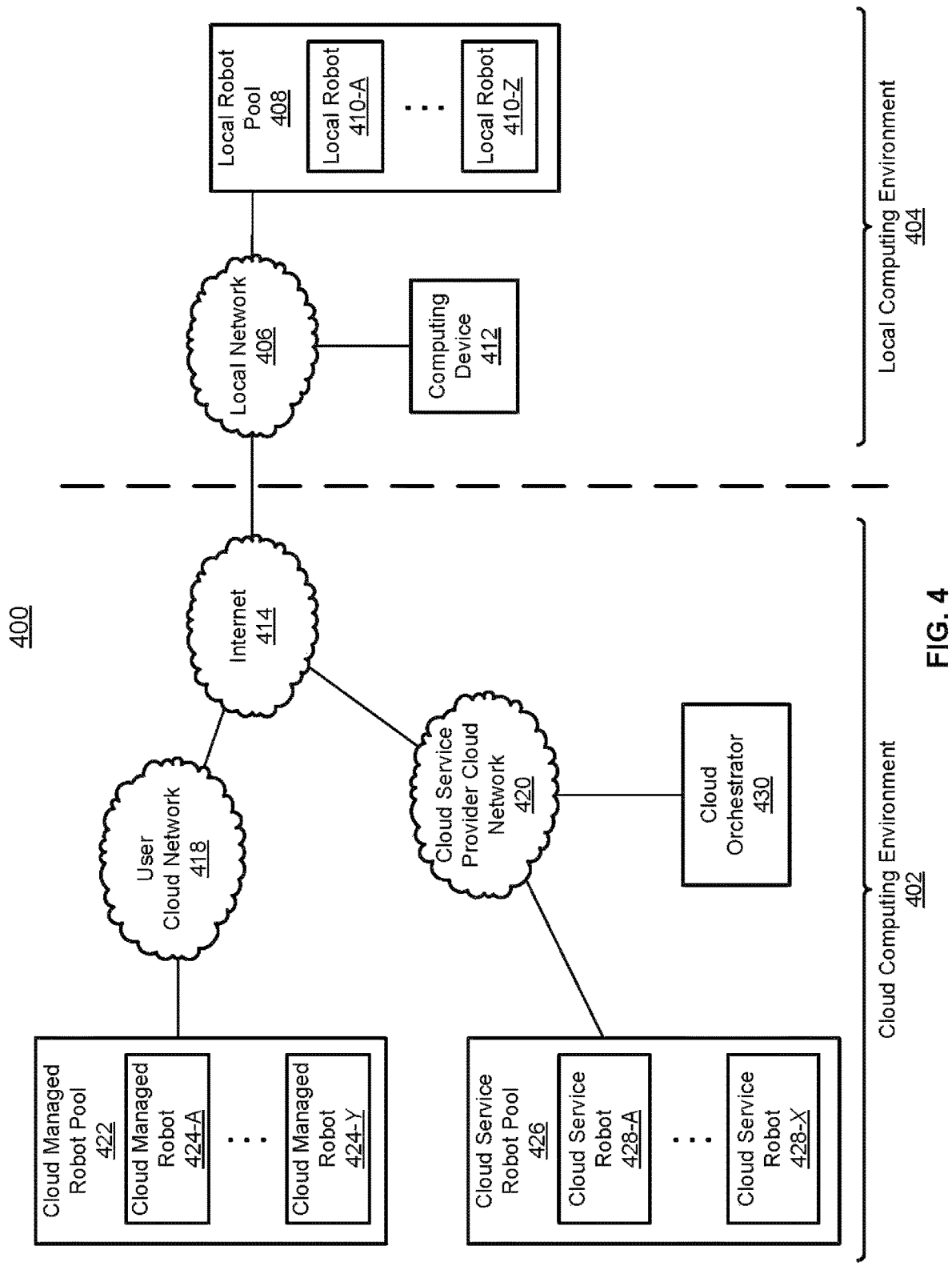
FIG. 4 shows an architecture diagram illustrating a cloud RPA system for implementing cloud-based management of robotic process automation robots, according to an embodiment of the invention.

FIG. 4 illustrates an architectural diagram of a cloud RPA system 400 for implementing cloud-based management of RPA robots, in accordance with one or more embodiments.

Cloud RPA system 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a pool of cloud robots that are deployed and maintained within cloud computing environment 402. Such cloud robots may include one or more cloud service robots 428-A, . . . , 428-X (hereinafter collectively referred to as cloud service robots 428) of cloud service robot pool 426 and one or more cloud managed robots 424-A, . . . , 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include one or more local robots 410-A, . . . , 410-Z (hereinafter collectively referred to as local robots 410) of local robot pool 408.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 enter into a standby mode while waiting to perform a task (or workflow). While in standby mode, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud service robots 428 wake up from standby mode to perform the task and return to standby mode once the task is complete. Accordingly, cloud service robots 428 perform the tasks on cloud service provider cloud network 420 for the user in local computing environment 404.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity.

During RPA development, workflows are defined by developers (or other users) interacting with an RPA designer application to define each activity of the workflow. For example, such RPA designer application may be designer 102 of RPA system 100 of FIG. 1, designer 208 of RPA system 200 of FIG. 2, a designer (not shown) of RPA system 300 of FIG. 3, or a designer (not shown) of cloud RPA system 400 of FIG. 4. Conventionally, developers design workflows by individually and separately selecting an interactive UI (user interface) element from a window of an application and recording an automation for the selected interactive UI element, which can be an intrusive and time-consuming process. Embodiments described herein facilitate the development of RPA workflows by mapping interactive UI elements to an RPA object repository. In this manner, developers can select one or more of a number of interactive UI elements from the RPA object repository to record automations, without having to select each interactive UI element from the window of the application. Advantageously, embodiments described herein provide for the seamless recording of automations.

Figure 5:
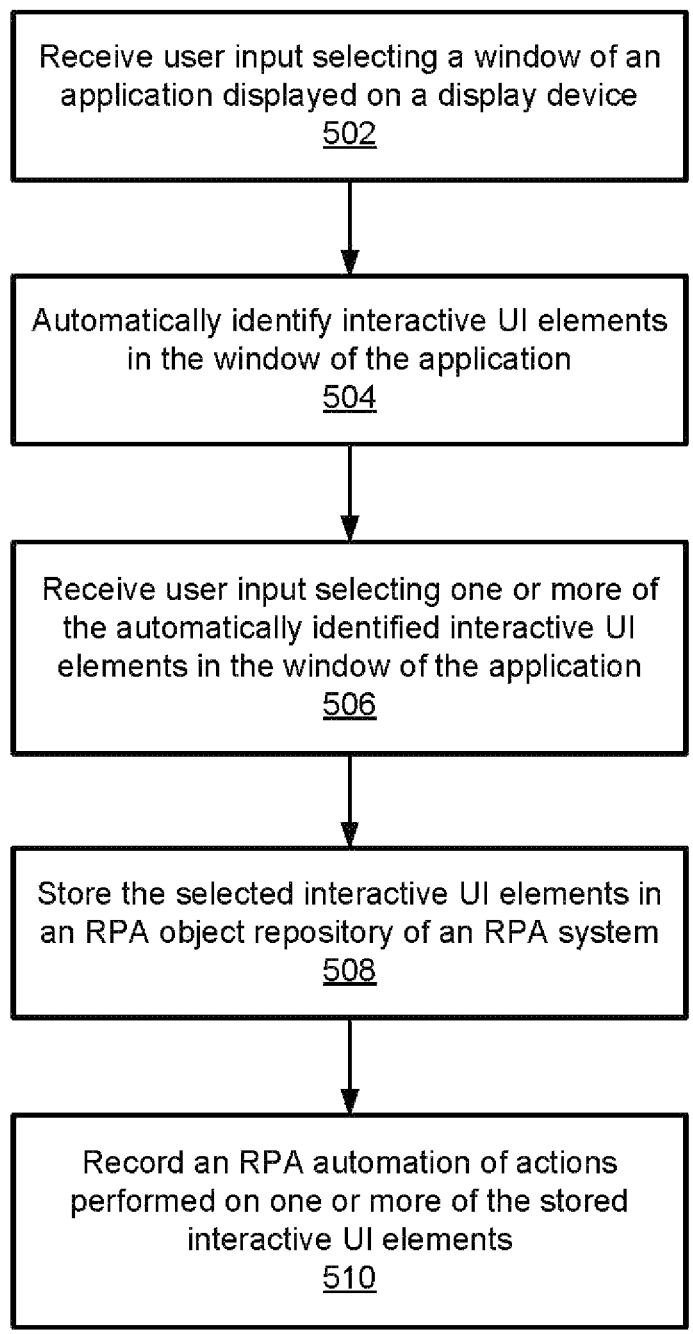
FIG. 5 shows a method for mapping interactive UI elements to an RPA object repository, in accordance with one or more embodiments.

FIG. 5 shows a method 500 for mapping interactive UI elements to an RPA object repository, in accordance with one or more embodiments. The steps of method 500 may be performed by one or more suitable computing devices, such as, e.g., computing system 1300 of FIG. 13.

At step 502 of FIG. 5, user input selecting a window of an application displayed on a display device is received. The user input is received from a developer or any other suitable user.

The user input selecting the window of the application is received during the design of an RPA workflow by the developer. During the design of the RPA workflow, the developer interacts with an RPA designer application to define each activity of the workflow. Activities of the workflow may be defined by selecting interactive UI elements from an RPA object repository via the designer application and recording actions performed on the interactive UI elements.

Figure 6:
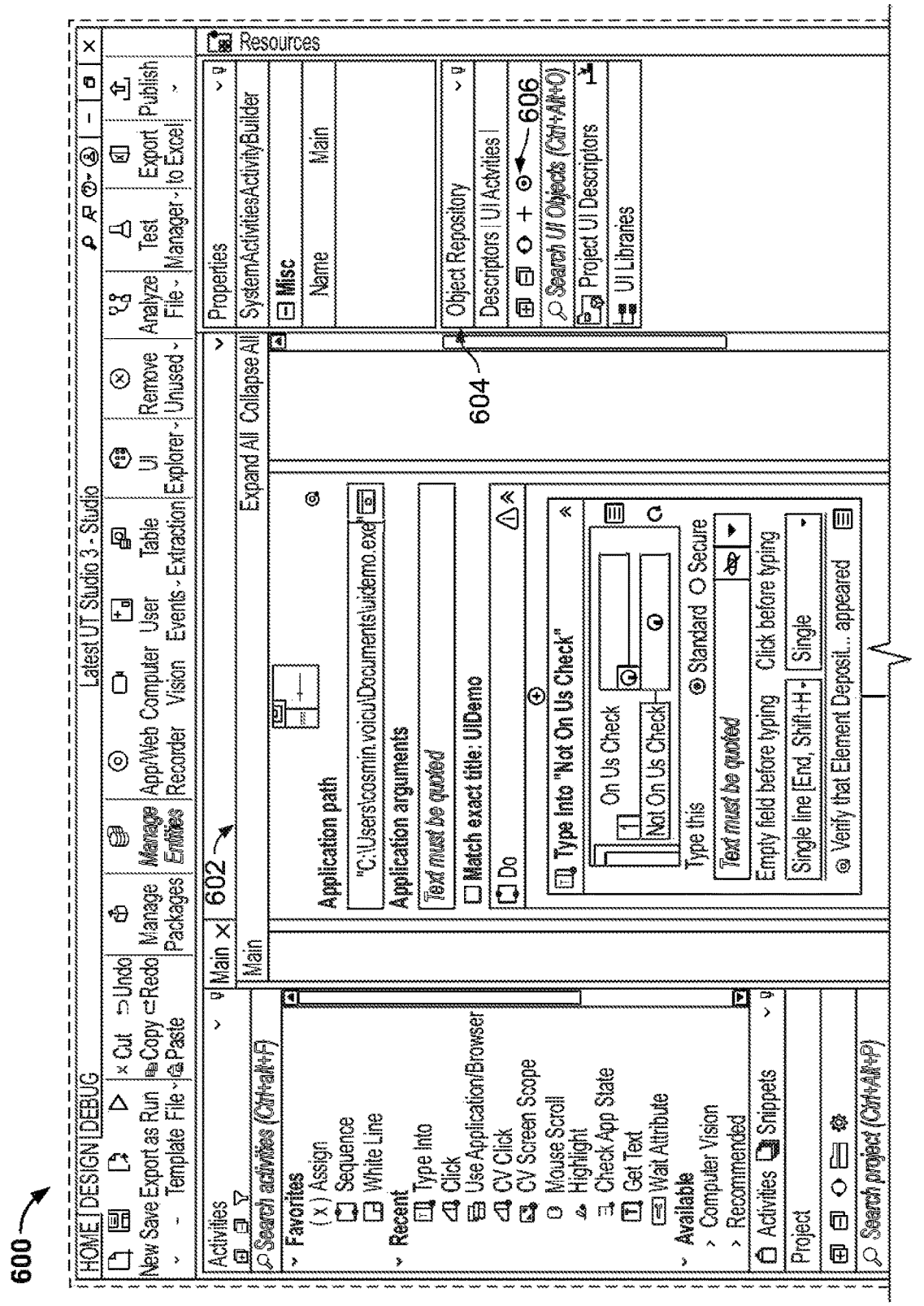
FIG. 6 shows a user interface of an RPA designer application, in accordance with one or more embodiments.
Figure 6:
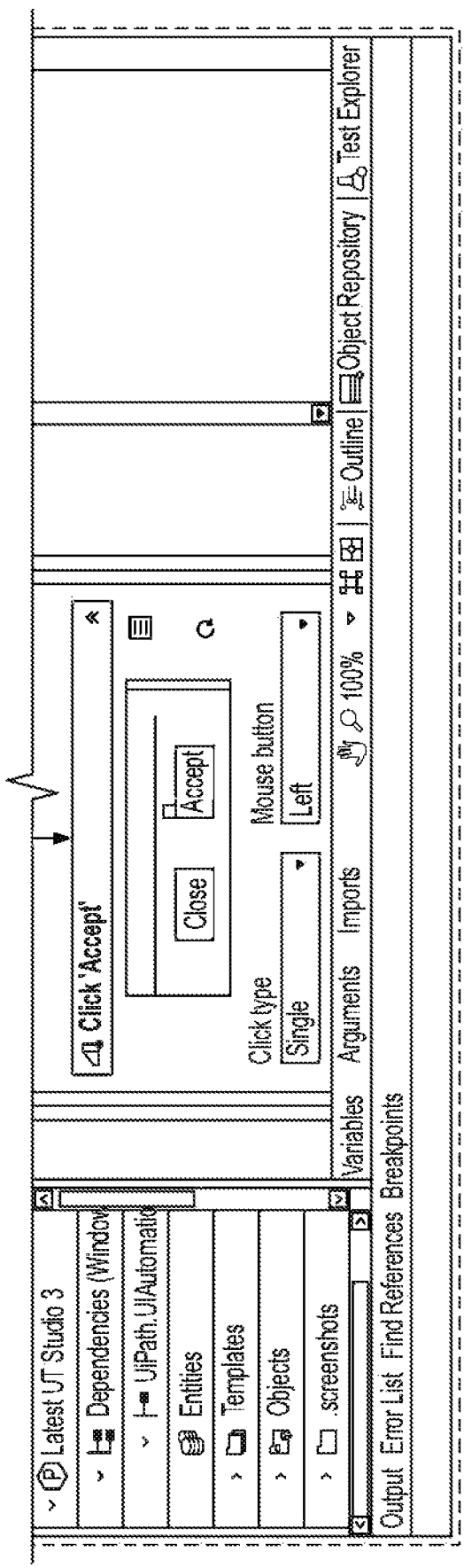

FIG. 6 shows a user interface 600 of an RPA designer application, in accordance with one or more embodiments. User interface 600 shows a main view 602 from which the developer defines RPA workflows and an object repository 604 storing interactive UI elements. As shown in FIG. 6, object repository 604 is empty. To capture interactive UI elements to store in object repository 604, the developer selects the recorder symbol 606, which launches a capture elements module.

Figure 7:
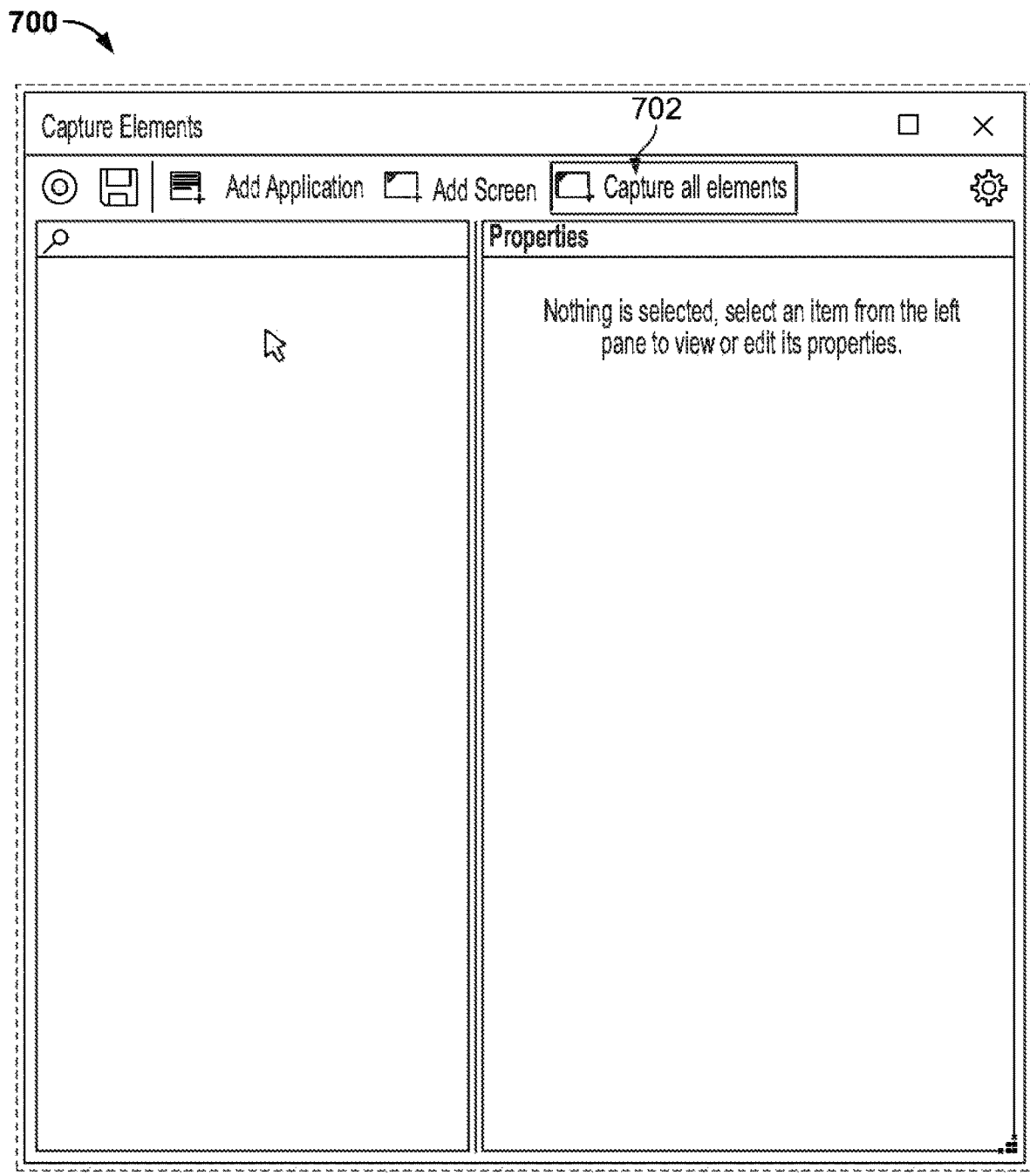
FIG. 7 shows a user interface of a capture elements module, in accordance with one or more embodiments.

FIG. 7 shows a user interface 700 of a capture elements module, in accordance with one or more embodiments. User interface 700 comprises a capture all elements button 702 for capturing all interactive UI elements in a selected window of an application. The developer selects capture all elements button 702, which launches a scan module to start the capture process.

Figure 8:
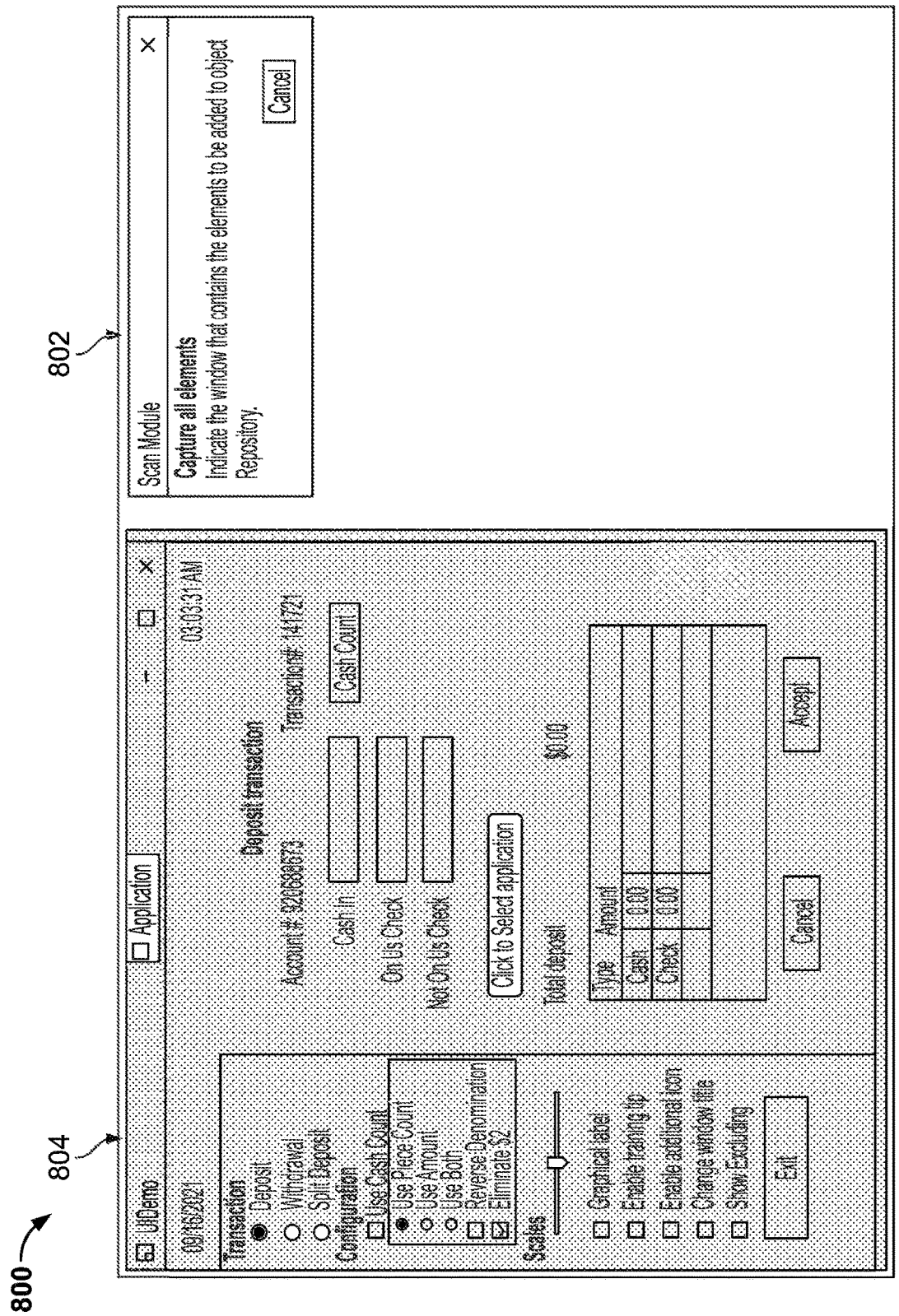
FIG. 8 shows a user interface for selecting a window of an application from which interactive UI elements are to be captured, in accordance with one or more embodiments.

FIG. 8 shows a user interface 800 for selecting a window of an application from which interactive UI elements are to be captured, in accordance with one or more embodiments. User interface 800 shows a scan module 802 prompting the developer to select a window of an application from which interactive UI elements are to be captured. In response to the prompt from scan module 802, the developer selects window 804. The selection of window 804 by the developer may be the user input selecting the window of the application at step 502 of FIG. 5.

At step 504 of FIG. 5, in response to receiving the user input selecting the window of the application, interactive UI elements are automatically identified in the window of the application. Interactive UI elements are user interface elements that a user may interact with. Exemplary interactive UI elements include buttons, checkboxes, text fields, etc.

The interactive UI elements may be automatically identified using any suitable approach. In one embodiment, the interactive UI elements are automatically identified using a trained machine learning based model. The trained machine learning based model receives as input an image of the window of the application and generates as output the image of the window of the application with the interactive UI elements identified thereon. The trained machine learning based model is trained during a prior offline or training stage using training data. The training data comprises training images of windows of applications annotated with interactive UI elements (e.g., by a user).

Figure 9:
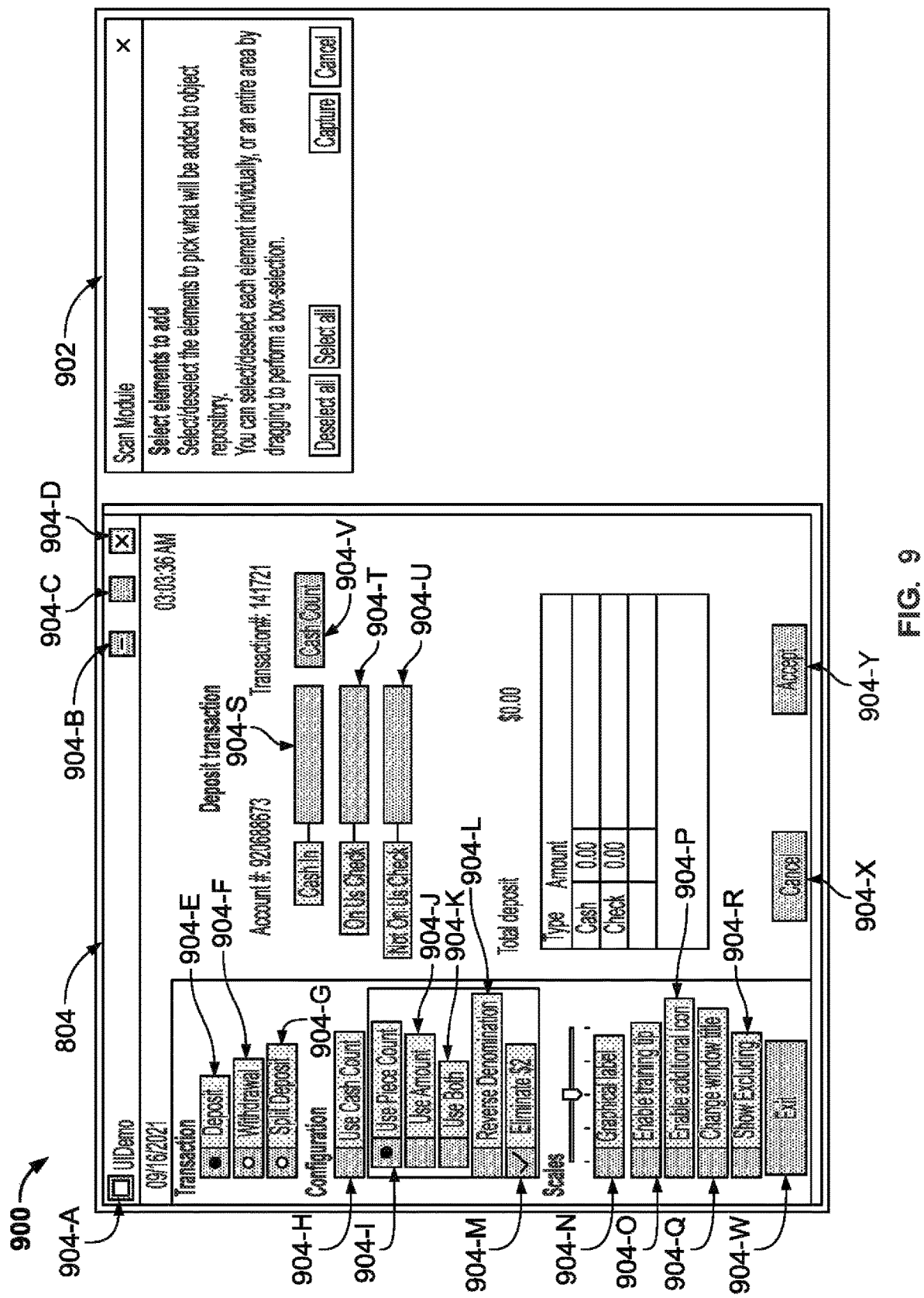
FIG. 9 shows a user interface identifying interactive UI elements, in accordance with one or more embodiments.

FIG. 9 shows a user interface 900 identifying interactive UI elements, in accordance with one or more embodiments. User interface 900 shows scan module 902 and window 804 of the application selected by the developer with interactive UI elements 904-A to 904-Y highlighted therein.

At step 506 of FIG. 5, user input selecting one or more of the identified interactive UI elements in the window of the application is received. In one embodiment, the user input may be a selection of a select all button or a deselect all button to respectively select all identified interactive UI elements or deselect all identified interactive UI elements. In another embodiment, the user input may additionally or alternatively be a selection or deselection of one or more interactive UI elements directly in the window of the application. In one embodiment, all identified interactive UI elements are automatically selected and user input is received to deselect one or more of the identified interactive UI elements.

Figure 10:
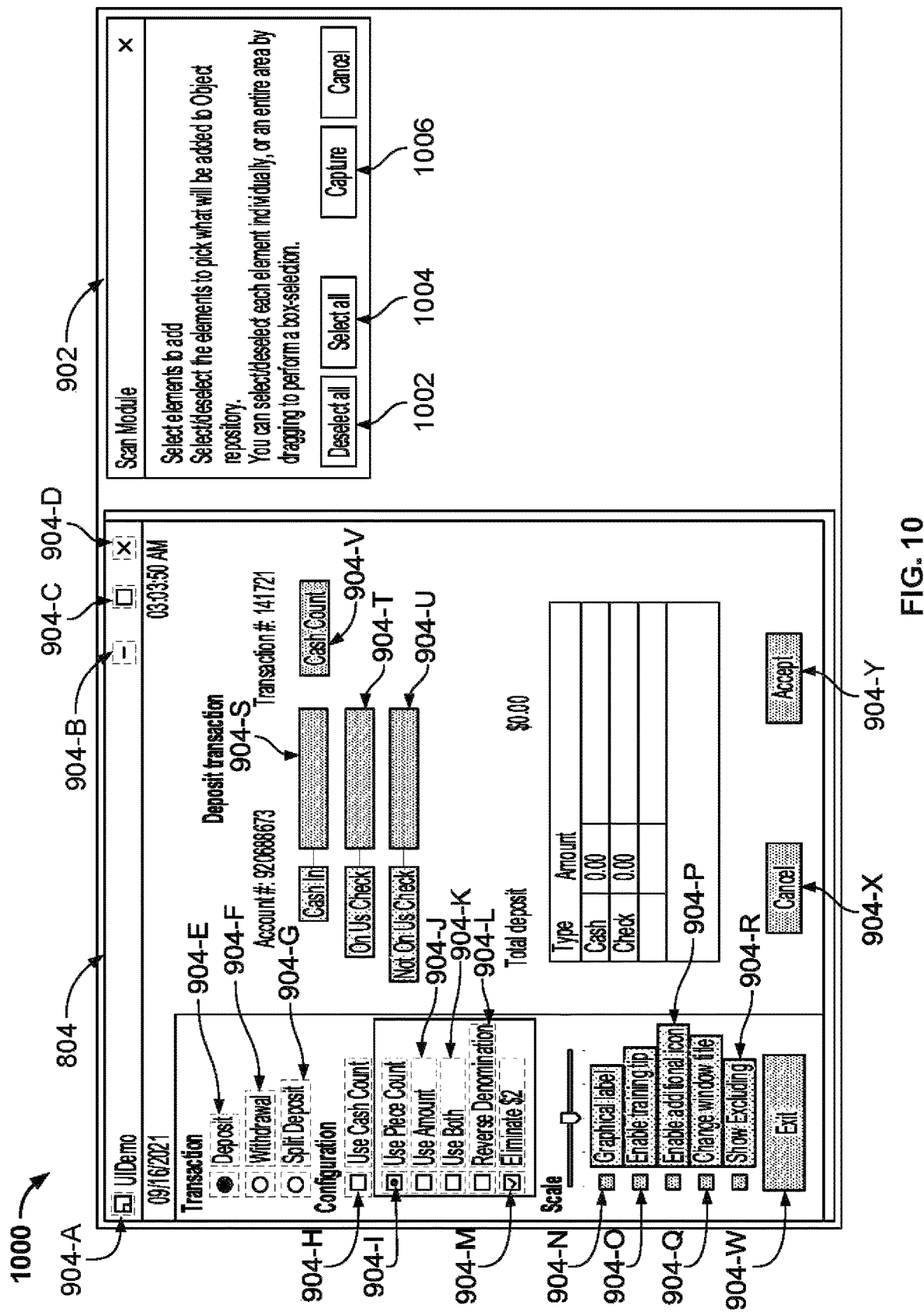
FIG. 10 shows a user interface for selecting interactive UI elements, in accordance with one or more embodiments.

FIG. 10 shows a user interface 1000 for selecting interactive UI elements, in accordance with one or more embodiments. In user interface 1000, the developer may select a deselect all button 1002 in scan module 902 to deselect all identified UI elements or a select all button 1004 to select all identified UI elements. The developer may additionally or alternatively select or deselect one or more interactive UI elements 904-A through 904-Y in window 804. As shown in FIG. 10, all identified interactive UI elements 904-A through 904-Y are automatically selected and the developer subsequently deselects interactive UI elements 904-A through 904-M, resulting in the selection of interactive UI elements 904-N though 904-Y. The developer finalizes the selection of interactive UI elements 904-N through 904-Y by selecting capture button 1006.

At step 508 of FIG. 5, the selected interactive UI elements are stored in an RPA object repository of an RPA system. In one example, the RPA system may be RPA system 100 of FIG. 1, RPA system 200 of FIG. 2, RPA system 300 of FIG. 3, or cloud RPA system 400 of FIG. 4.

Figure 11:
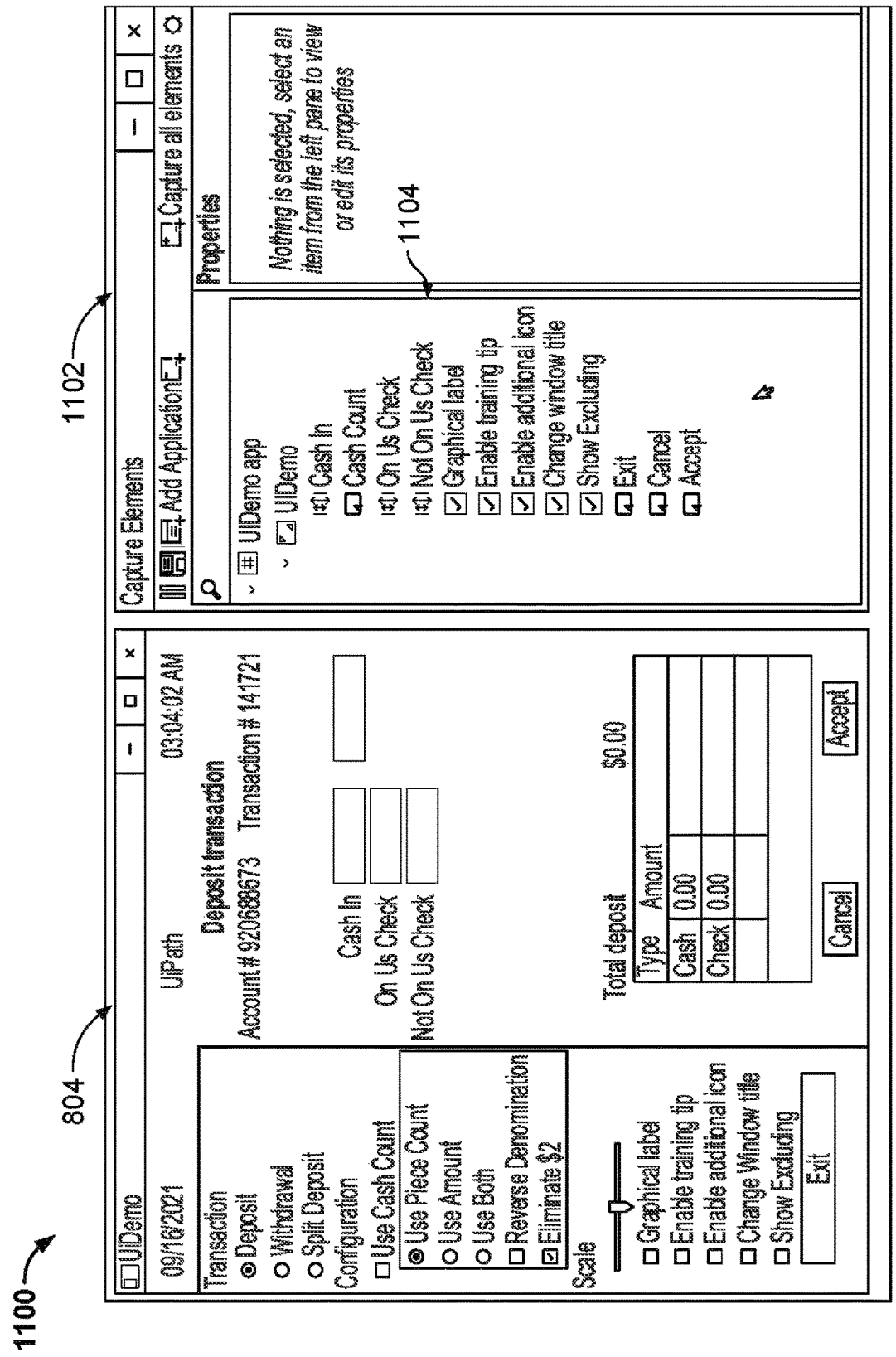
FIG. 11 shows a user interface showing interactive UI elements stored in an RPA object repository, in accordance with one or more embodiments.

FIG. 11 shows a user interface 1100 showing interactive UI elements stored in an RPA object repository, in accordance with one or more embodiments. User interface 1100 comprises a capture elements module 1102 showing an RPA object repository 1104 storing interactive UI elements selected from window 804.

In one embodiment, the selected interactive UI elements are compared with existing interactive UI elements stored in the RPA object repository to determine whether the selected interactive UI elements are duplicates. To perform the comparison, all descriptors associated with the existing interactive UI elements stored in the RPA object repository are retrieved. Descriptors hold information uniquely identifying their associated existing interactive UI elements. The descriptors are passed through a filter to determine whether their associated existing interactive UI elements are potential candidates for matching with the selected interactive UI elements. The filter generates a match score (e.g., from zero to one, where zero indicates no match to the selected interactive UI elements and one indicates a match to the selected interactive UI elements). If the filter identifies a descriptor with a maximum match score (i.e., indicating a match), the existing interactive UI element associated with that descriptor is returned as a match to the selected interactive UI element. If the filter identifies multiple descriptors with a maximum match score, the developer can select one of the multiple descriptors and the existing interactive UI element associated with the selected descriptor is returned as matching the selected interactive UI element. If the filter does not identify any descriptor with a maximum match score, the descriptors with the top N match scores (where N is any positive integer, such as, e.g., 5) are identified and a full unified target algorithm is applied on the identified descriptors. If the unified target algorithm determines that an identified descriptor matches the selected interactive UI elements, the existing interactive UI elements associated with that identified descriptor is returned as matching with the selected interactive UI elements. Otherwise, if the unified target algorithm determines that none of the identified descriptors match the selected interactive UI elements, the selected interactive UI elements are not considered duplicates and the selected interactive UI elements are stored in the RPA object repository. In this manner, only selected interactive UI elements that do not match with existing interactive UI elements are stored in the RPA object repository.

Figure 12:
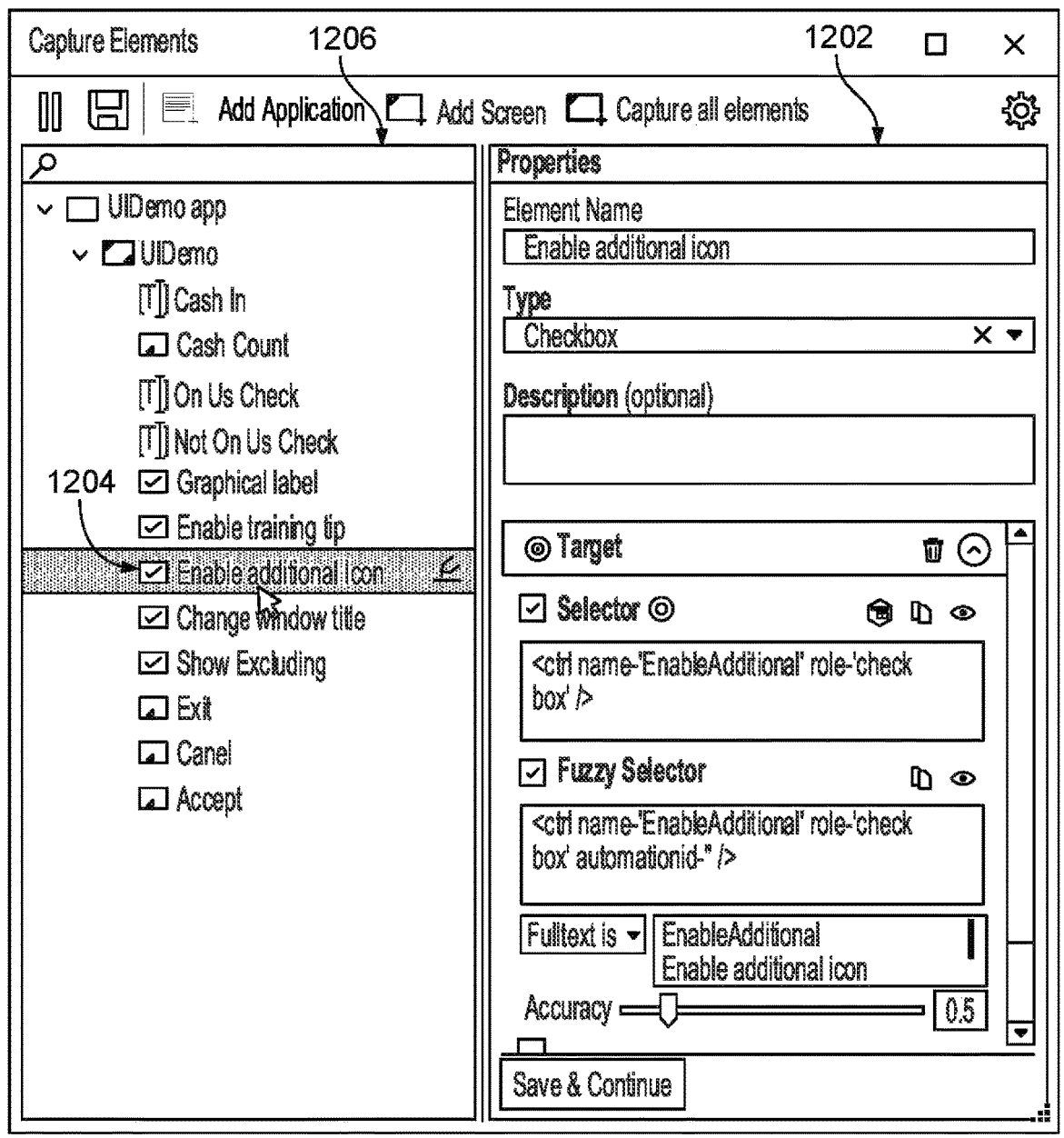
FIG. 12 shows a user interface showing a capture elements module, in accordance with one or more embodiments.

In one embodiment, user input may be received from the developer for editing and saving properties of the interactive UI elements stored in the object repository. FIG. 12 shows a user interface 1200 showing a capture elements module, in accordance with one or more embodiments. User interface 1200 comprises a properties panel 1202 for editing properties of a selected interactive UI element 1204 stored in RPA object repository 1206. Exemplary properties that may be edited in properties panel 1202 include element name, type, description, selector, and fuzzy selector. In one embodiment, a semantic meaning of the interactive UI elements may also be stored in RPA object repository 1202.

In one embodiment, the interactive UI elements stored in the RPA object repository may be tested by the developer to determine whether all interactive UI elements in the window of the application are identified. If one or more interactive UI elements in the window were not identified, the unidentified interactive UI elements are marked as not found or problematic.

At step 510 of FIG. 5, an RPA automation of actions performed on one or more of the stored interactive UI elements is recorded. The actions performed on one or more of the stored interactive UI elements is performed by the developer. The recorded RPA automation may be stored in the RPA object repository and used to define activities of an RPA workflow.

Figure 13:
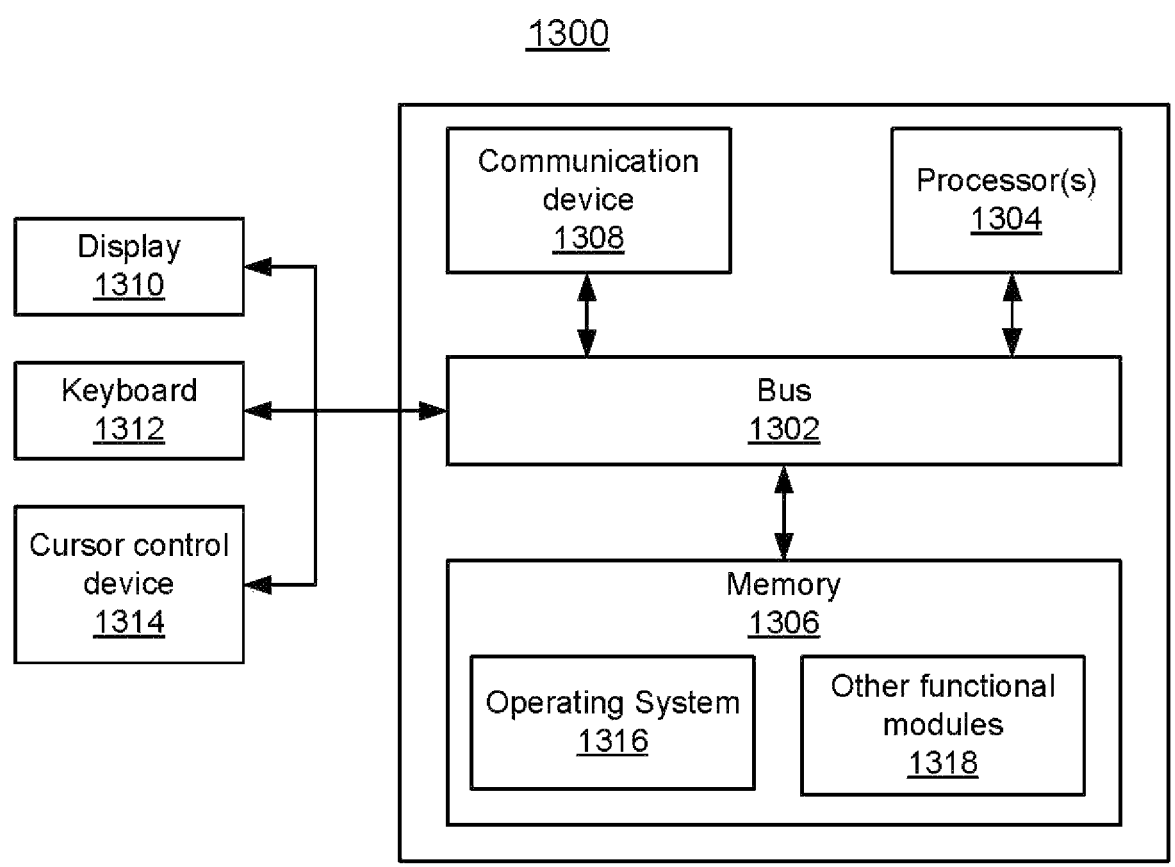
FIG. 13 is a block diagram of a computing system, which may be used to implemented embodiments of the invention.

FIG. 13 is a block diagram illustrating a computing system 1300 configured to execute the methods, workflows, and processes described herein, including method 500 of FIG. 5, according to an embodiment of the present invention. In some embodiments, computing system 1300 may be one or more of the computing systems depicted and/or described herein. Computing system 1300 includes a bus 1302 or other communication mechanism for communicating information, and processor(s) 1304 coupled to bus 1302 for processing information. Processor(s) 1304 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1304 may also have multiple processing cores, and at least some of the cores may be configured to perform specific functions. Multi-parallel processing may be used in some embodiments.

Computing system 1300 further includes a memory 1306 for storing information and instructions to be executed by processor(s) 1304. Memory 1306 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1304 and may include volatile media, non-volatile media, or both. The media may also be removable, non-removable, or both.

Additionally, computing system 1300 includes a communication device 1308, such as a transceiver, to provide access to a communications network via a wireless and/or wired connection according to any currently existing or future-implemented communications standard and/or protocol.

Processor(s) 1304 are further coupled via bus 1302 to a display 1310 that is suitable for displaying information to a user. Display 1310 may also be configured as a touch display and/or any suitable haptic I/O device.

A keyboard 1312 and a cursor control device 1314, such as a computer mouse, a touchpad, etc., are further coupled to bus 1302 to enable a user to interface with computing system. However, in certain embodiments, a physical keyboard and mouse may not be present, and the user may interact with the device solely through display 1310 and/or a touchpad (not shown). Any type and combination of input devices may be used as a matter of design choice. In certain embodiments, no physical input device and/or display is present. For instance, the user may interact with computing system 1300 remotely via another computing system in communication therewith, or computing system 1300 may operate autonomously.

Memory 1306 stores software modules that provide functionality when executed by processor(s) 1304. The modules include an operating system 1316 for computing system 1300 and one or more additional functional modules 1318 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
   receiving user input selecting a window of an application displayed on a display device;
   in response to receiving the user input selecting the window of the application, automatically identifying interactive UI (user interface) elements in the window of the application;
   receiving user input selecting one or more of the identified interactive UI elements in the window of the application;
   storing the one or more selected interactive UI elements in an RPA (robotic process automation) object repository of an RPA system by:
      filtering descriptors associated with existing interactive UI elements to generate match scores,
      identifying descriptors with a top N match scores, where N is any positive integer,
      applying a unified target algorithm to the identified descriptors to determine whether the identified descriptors match the one or more selected interactive UI elements, and
      storing the one or more selected interactive UI elements in the RPA object repository in response to the unified target algorithm determining that the identified descriptors do not match the one or more selected interactive UI elements; and
   recording an RPA automation of actions performed on the one or more interactive UI elements stored in the RPA object repository.

2. The computer-implemented method of claim 1, further comprising automatically selecting the identified interactive UI elements, and wherein receiving user input selecting one or more of the identified interactive UI elements in the window of the application comprises:
   receiving user input deselecting one or more of the automatically selected interactive UI elements.

3. The computer-implemented method of claim 1, further comprising:
   receiving user input editing properties of the stored interactive UI elements.

4. The computer-implemented method of claim 1, wherein the identifying of the descriptors with the top N match scores is in response to determining that none of the match scores are a maximum match score.

5. The computer-implemented method of claim 1, wherein the interactive UI elements comprises one or more of buttons, checkboxes, or text fields.

6. An apparatus comprising:
   a memory storing computer program instructions; and
   at least one processor configured to execute the computer program instructions, the computer program instructions configured to cause the at least one processor to perform operations of:
   receiving user input selecting a window of an application displayed on a display device;
   in response to receiving the user input selecting the window of the application, automatically identifying interactive UI (user interface) elements in the window of the application;
   receiving user input selecting one or more of the identified interactive UI elements in the window of the application;
   storing the one or more selected interactive UI elements in an RPA (robotic process automation) object repository of an RPA system by:
      filtering descriptors associated with existing interactive UI elements to generate match scores,
      identifying descriptors with a top N match scores, where N is any positive integer,
      applying a unified target algorithm to the identified descriptors to determine whether the identified descriptors match the one or more selected interactive UI elements, and storing the one or more selected interactive UI elements in the RPA object repository in response to the unified target algorithm determining that the identified descriptors do not match the one or more selected interactive UI elements; and recording an RPA automation of actions performed on the one or more interactive UI elements stored in the RPA object repository.

7. The apparatus of claim 6, the operations further comprising automatically selecting the identified interactive UI elements, and wherein receiving user input selecting one or more of the identified interactive UI elements in the window of the application comprises:

receiving user input deselecting one or more of the automatically selected interactive UI elements.

8. The apparatus of claim 6, the operations further comprising:

receiving user input editing properties of the stored interactive UI elements.

9. The apparatus of claim 6, wherein the identifying of the descriptors with the top N match scores is in response to determining that none of the match scores are a maximum match score.

10. The apparatus of claim 6, wherein the interactive UI elements comprises one or more of buttons, checkboxes, or text fields.

11. A non-transitory computer-readable medium storing computer program instructions, the computer program instructions, when executed on at least one processor, cause the at least one processor to perform operations comprising:

receiving user input selecting a window of an application displayed on a display device;

in response to receiving the user input selecting the window of the application, automatically identifying interactive UI (user interface) elements in the window of the application;

receiving user input selecting one or more of the identified interactive UI elements in the window of the application;

storing the one or more selected interactive UI elements in an RPA (robotic process automation) object repository of an RPA system by:

filtering descriptors associated with existing interactive UI elements to generate match scores, identifying descriptors with a top N match scores, where N is any positive integer, applying a unified target algorithm to the identified descriptors to determine whether the identified descriptors match the one or more selected interactive UI elements, and storing the one or more selected interactive UI elements in the RPA object repository in response to the unified target algorithm determining that the identified descriptors do not match the one or more selected interactive UI elements; and recording an RPA automation of actions performed on the one or more interactive UI elements stored in the RPA object repository.

12. The non-transitory computer-readable medium of claim 11, the operations further comprising automatically selecting the identified interactive UI elements, and wherein receiving user input selecting one or more of the identified interactive UI elements in the window of the application comprises:

receiving user input deselecting one or more of the automatically selected interactive UI elements.

13. The non-transitory computer-readable medium of claim 11, the operations further comprising:

receiving user input editing properties of the stored interactive UI elements.

14. The non-transitory computer-readable medium of claim 11, wherein the identifying of the descriptors with the top N match scores is in response to determining that none of the match scores are a maximum match score.

15. The non-transitory computer-readable medium of claim 11, wherein the interactive UI elements comprises one or more of buttons, checkboxes, or text fields.

* * * * *